(12) United States Patent
Hurwitz

(10) Patent No.: US 11,531,765 B2
(45) Date of Patent: Dec. 20, 2022

(54) DYNAMIC SYSTEM PROFILING BASED ON DATA EXTRACTION

(71) Applicant: Allstate Insurance Company, Northbrook, IL (US)

(72) Inventor: Joshua Hurwitz, Niles, IL (US)

(73) Assignee: ALLSTATE INSURANCE COMPANY, Northbrook, IL (US)

(*) Notice: Subject to any disclaimer, the term of this patent is extended or adjusted under 35 U.S.C. 154(b) by 133 days.

(21) Appl. No.: 16/930,495

(22) Filed: Jul. 16, 2020

(65) Prior Publication Data

US 2022/0019672 A1  Jan. 20, 2022

(51) Int. Cl.
| | | |
|---|---|---|
| G06F 21/00 | (2013.01) | |
| G06F 21/57 | (2013.01) | |
| G06F 21/64 | (2013.01) | |
| G06F 16/28 | (2019.01) | |
| G06F 21/62 | (2013.01) | |

(52) U.S. Cl.
CPC .......... *G06F 21/577* (2013.01); *G06F 16/285* (2019.01); *G06F 21/6245* (2013.01); *G06F 21/64* (2013.01); *G06F 2221/033* (2013.01)

(58) Field of Classification Search
CPC .. G06F 21/577; G06F 16/285; G06F 21/6245; G06F 21/64; G06F 2221/033
See application file for complete search history.

(56) References Cited

U.S. PATENT DOCUMENTS

| | | | |
|---|---|---|---|
| 7,966,663 | B2 | 6/2011 | Strickland et al. |
| 8,925,099 | B1 | 12/2014 | Saxe et al. |
| 9,214,448 | B2 | 12/2015 | Rong et al. |
| 9,235,704 | B2 | 1/2016 | Wootton et al. |
| 9,672,355 | B2 | 6/2017 | Titonis et al. |

(Continued)

FOREIGN PATENT DOCUMENTS

| | | |
|---|---|---|
| CN | 106339396 B | 8/2019 |
| CN | 110210223 A | 9/2019 |

(Continued)

OTHER PUBLICATIONS

Characterizing Privacy Risks of Mobile Apps with Sensitivity Analysis IEEE Transactions on Mobile Computing Zhang et al. revised May 19, 2017 14 pages.

(Continued)

*Primary Examiner* — Ghazal B Shehni
(74) *Attorney, Agent, or Firm* — Polsinelli PC

(57) ABSTRACT

Methods, computer-readable media, software, systems and apparatuses may retrieve, via a computing device and over a network, information related to one or more characteristics of a particular application or service deployed in a computing environment. The particular application or service may be associated with a class of applications or services based on the information. A type of personal data collected may be determined for each application or service in the associated class. For the particular application or service, a risk metric indicative of a type of personal data collected by the particular application or service in relation to the type of personal data collected by other applications or services in the associated class may be determined. An additional application or service with a lower risk than the particular application or service may be recommended.

20 Claims, 5 Drawing Sheets

(56) References Cited

U.S. PATENT DOCUMENTS

| | | |
|---|---|---|
| 10,474,827 B2 | 11/2019 | Zhu et al. |
| 10,498,769 B2 | 12/2019 | Sartor |
| 10,574,540 B2 | 2/2020 | Sambandam |
| 2004/0186753 A1 | 9/2004 | Kim et al. |
| 2006/0100912 A1 | 5/2006 | Kumar et al. |
| 2009/0178142 A1* | 7/2009 | Lieblich ............ H04L 63/20 726/25 |
| 2009/0234683 A1* | 9/2009 | Anderson ............ G06Q 20/10 705/38 |
| 2010/0036684 A1 | 2/2010 | McNamee et al. |
| 2010/0070309 A1 | 3/2010 | Deede et al. |
| 2014/0282977 A1* | 9/2014 | Madhu ............ G06Q 50/265 726/7 |
| 2017/0270318 A1 | 9/2017 | Ritchie |
| 2018/0330100 A1 | 11/2018 | Bar Joseph et al. |
| 2020/0001044 A1 | 1/2020 | Ramanathan |
| 2020/0104470 A1 | 4/2020 | Barday et al. |
| 2020/0104529 A1 | 4/2020 | Barday |

FOREIGN PATENT DOCUMENTS

| | | |
|---|---|---|
| CN | 110298176 A | 10/2019 |
| CN | 107403092 B | 12/2019 |
| KR | 20120135708 A | 12/2012 |
| WO | 2013067006 A1 | 5/2013 |
| WO | 2017111967 A1 | 6/2017 |

OTHER PUBLICATIONS

International Search Report and Written Opinion of the International Searching Authority for PCT/US2021/041780 dated Nov. 15, 2021 (8 pages).

* cited by examiner

DYNAMIC SYSTEM PROFILING BASED ON DATA EXTRACTION

FIELD OF ART

Aspects of the disclosure generally relate to methods and computer systems, including one or more computers particularly configured and/or executing computer software to identify applications or services with a low privacy risk profile. More specifically, aspects of this disclosure relate to a dynamic system profiling based on data extraction.

BACKGROUND

Applications and services may collect data, which in some cases may be sensitive information. In some instances, data collection may be utilized to provide certain features and/or functionalities to users. However, in other instances, data may be collected solely to facilitate targeted advertising and other marketing strategies. Furthermore, such collected data may be sold or otherwise provided to other companies. In some instances, there may be a risk of loss of data due to security vulnerabilities in a system.

Application developers and service providers may generally disclose a type, nature, and/or amount of data collected by the software or service. However, end users may not be attentive to such disclosures. Furthermore, users may not understand the risks, and may sometimes forget what data is being collected, due to a large number of applications and services they may be using. Also, in some instances, users may not understand the full scope of any benefit provided by such data collection. Also, for example, parents may not fully understand an extent and/or type of data that may be collected by applications or services being used by their children.

Accordingly, there may be an advantage to automatically analyze disclosures provided by application developers and service providers to determine risk profiles associated with applications and services. In some instances, it may be of significance to compare risk profiles for different applications or services that may provide similar functionalities. In some aspects, it may be advantageous to automatically identify and recommend applications and/or services that may carry a lower risk of unnecessary data collection.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for a dynamic system profiling based on data extraction.

In some aspects, a privacy risk determination system may include a privacy risk processing system and a privacy risk analysis system. The privacy risk determination system may include at least one processor and a memory unit storing computer-executable instructions. In some embodiments, the computer-executable instructions may be stored in one or more non-transitory computer-readable media. The privacy risk determination system may be configured to, in operation, retrieve, via a computing device and over a network, information related to one or more characteristics of a particular application or service deployed in a computing environment. The privacy risk determination system may be configured to associate, via the computing device and based on the information, the particular application or service with a class of applications or services. The privacy risk determination system may be configured to determine, for each application or service in the associated class, a type of personal data collected. The privacy risk determination system may be configured to determine, for the particular application or service, a risk metric indicative of a type of personal data collected by the particular application or service in relation to the type of personal data collected by other applications or services in the associated class. The privacy risk determination system may be configured to recommend, via the computing device and based on the risk metric, an additional application or service with a lower risk than the particular application or service.

In some aspects, the privacy risk determination system may be configured to determine, for the associated class, a composite risk metric indicative of a type of personal data collected by the applications or services in the associated class, where the composite risk metric is an aggregate of risk metrics of applications or services in the associated class. In some arrangements, the privacy risk determination system may be configured to, in operation, recommend the additional application or service is based on the composite risk metric.

In some aspects, the privacy risk determination system may be configured to determine a probability that an application or service in the associated class collects personal data, and determine the risk metric based on the probability.

In some arrangements, the class of applications or services may include one of: a gaming application, a productivity application, and a music application.

In other aspects, the one or more characteristics may include one or more of: (1) whether the particular application or service enables sharing with other users over the network, (2) whether the application or service incorporates opportunities to purchase other products or services, and (3) whether the particular application or service enables an offering of a commercial advertisement.

In some aspects, the one or more characteristics may include a content rating for the particular application or service.

In other aspects, the privacy risk determination system may be configured to extract the information related to the one or more characteristics from one or more of a description and a review of the particular application or service.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for a dynamic system profiling based on data extraction. As described herein, applications and services may collect data, such as, for example, sensitive, personal, and/or private information (e.g., during use of the application or service, in registering for use of the application or service, or the like). For example, an application or service may require a name, date of birth, location information, email address, and so forth. In some instances, such sensitive information may not be necessary to provide features and/or functionalities of the application or service to users.

Generally, when users are made aware of risks to their privacy, they may take steps to mitigate that risk. For example, users may deny access to personal data to a particular application or service, or they may not use a particular application or service, and/or they may switch to another application or service that does not collect personal data, or collects less information.

Accordingly, as described herein, a dynamic system profiling based on data extraction may utilize disclosures published by application developers and service providers to estimate or predict privacy risks inherent in such applications and services. In some aspects, the risk determination system may identify applications or services that provide similar functionality, but that may have a lower risk profile. For example, the risk determination system may collect disclosure information provided by application developers and service providers, and then utilize such information to identify applications or services that may be collecting more personal data of a given type or types relative to other similar applications or services.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
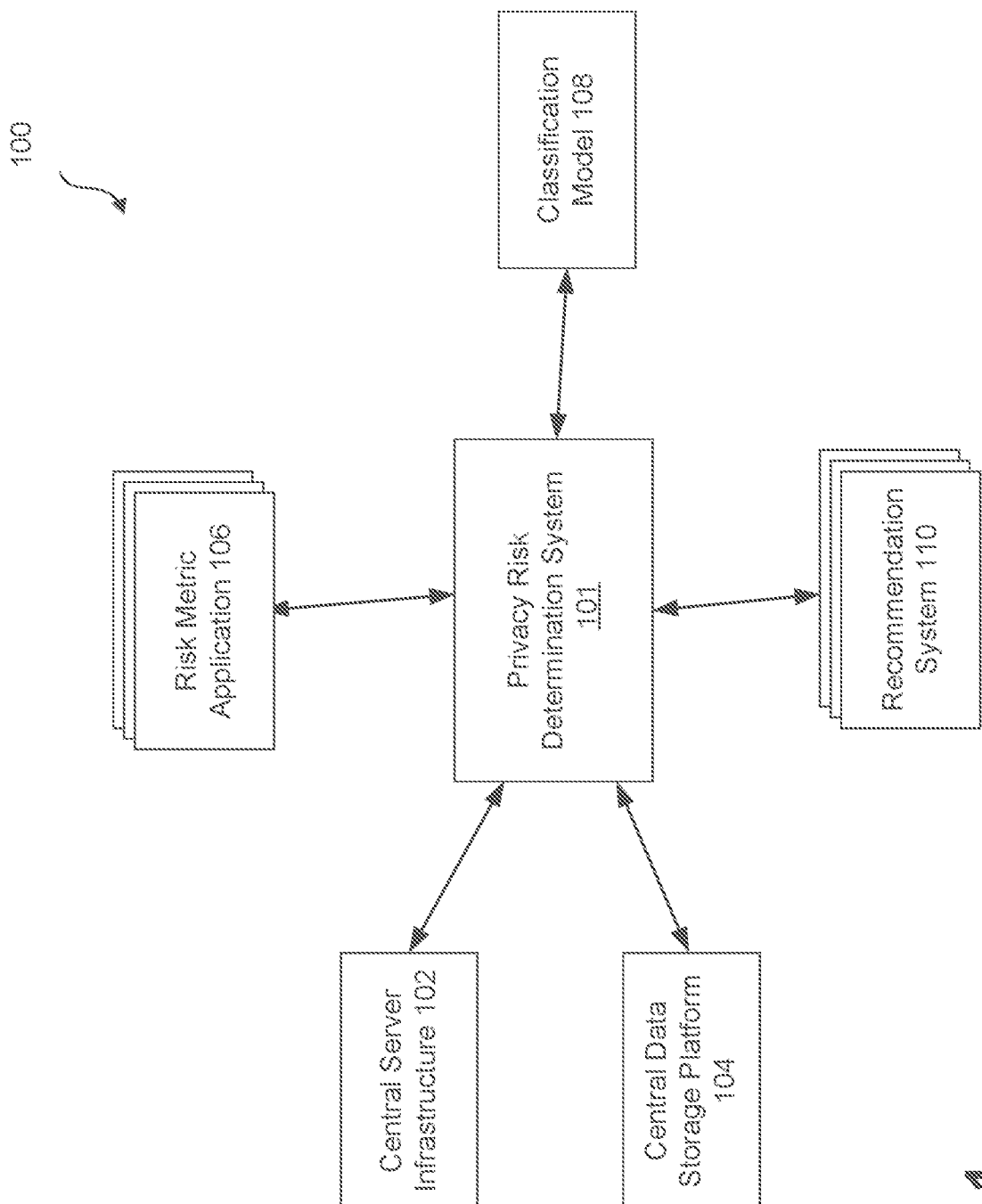
FIG. 1 shows a block diagram illustrating the system architecture for a dynamic system profiling based on data extraction in accordance with one or more aspects described herein.
Figure 2:
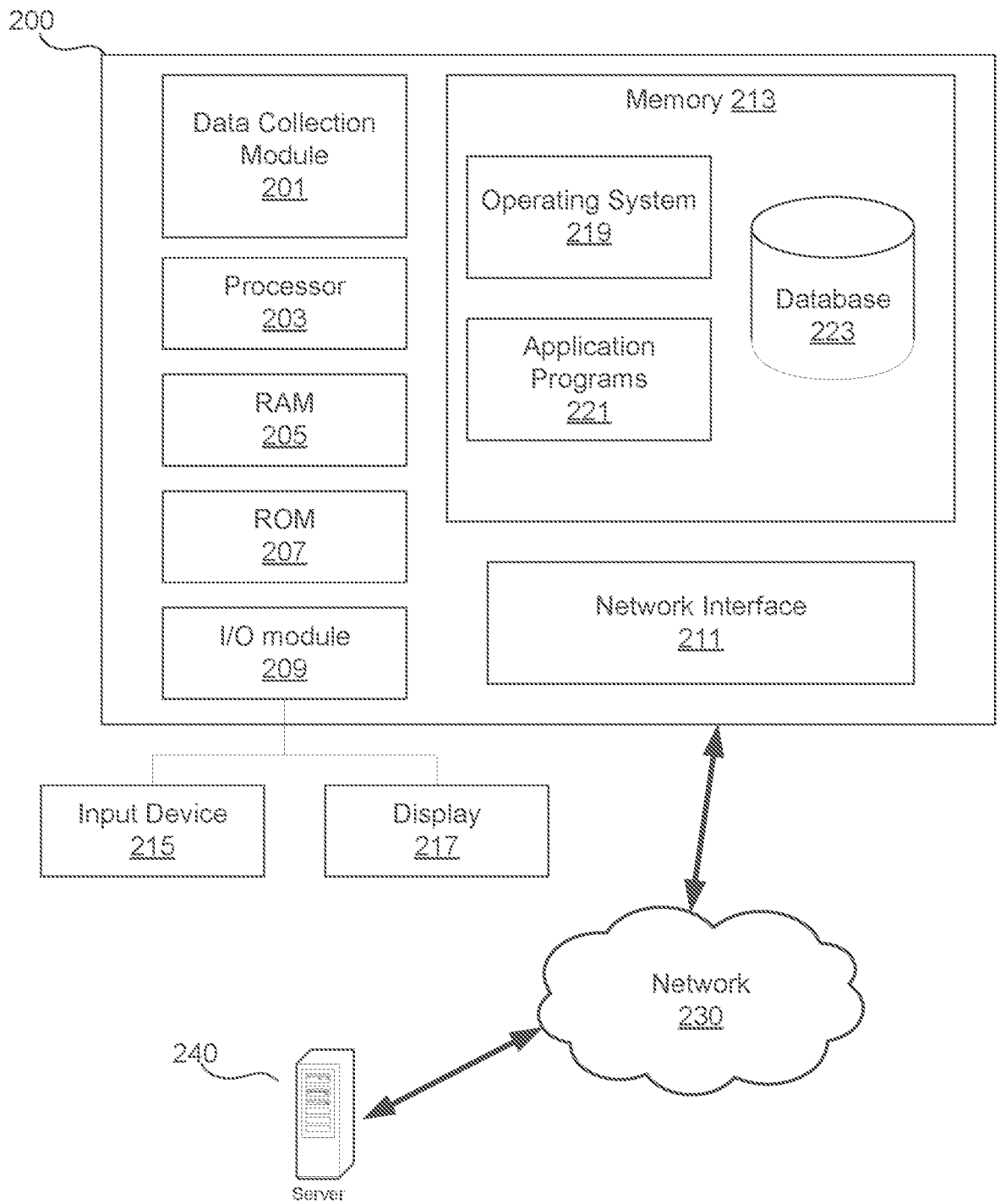
FIG. 2 illustrates an example privacy risk determination device that may be used in accordance with one or more aspects described herein.

FIG. 1 shows a block diagram illustrating system architecture 100 for a dynamic system profiling based on data extraction in accordance with one or more aspects described herein. A privacy risk determination system 101 may retrieve, via a computing device and over a network, information related to one or more characteristics of a particular application or service deployed in a computing environment. In some instances, the privacy risk determination system 101 may be or include one or more components of privacy risk determination device 200, as shown in FIG. 2.

Applications or services may be provided via various servers over the world wide web ("WWW"), or may be downloaded by computing devices (e.g., smartphones, tablet computing devices, or the like) to be run locally. Generally, such applications or services collect user information. For example, websites may collect user information via cookies, which may track, collect, and/or store data related to a user's browsing activity. In some instances, such user information may be utilized to improve a feature or functionality of an application or service. In some instances, such information may be collected to customize the application or service to enhance user experience.

With the advent of mobile computing devices, software programs (or mobile applications) for operating systems run on a mobile device have become widely prevalent. For example, mobile applications may be configured to run on a variety of operating systems ("OS") such as iOS, Android, or Windows Phone OS. Such mobile applications may collect user information and share it with others within an ecosystem, such as, for example, OS developers, app store platforms, advertisers, service providers, device manufacturers, other users, and so forth.

Information may include, for example, a type of data that is collected, a purpose for such data collection, how the data may be used, where the data may be stored, who the data may be shared with (names and websites of third parties), and so forth. In some instances, the information may include personal data, such as, for example, personally identifiable information ("PII"), personal health information ("PHI"), and/or personal credit information ("PCI"). For example, an application that provides email services may collect a user's name, date of birth, gender, contact information, location data, content of messages, and so forth. As another example, an application that provides health related services may collect a user's name, date of birth, gender, height, weight, contact information, location data, biometric information, health insurance information, health information, prescription information, and so forth. As another example, an application that provides financial services may collect a user's name, date of birth, gender, contact information, location data, financial information, employment information, salary, retirement related information, information related to a trading portfolio, credit card information, and so forth.

In some instances, an application or service may collect "pseudonymous" or "anonymous" data that may be used to customize features to user requirements. However, such pseudonymous or anonymous data may, in aggregate, disclose personally identifiable information. For example, data from a global positioning system ("GPS") may be combined with gender, demographic data, and/or age range data, to identify an individual.

Generally, application developers and service providers may provide disclosures related to the information that may be collected. For example, the information related to the one or more characteristics of a particular application or service may include information, such as, whether data is being shared with third party advertisers for advertising (e.g., behavioral advertising) purposes. Also, for example, the information may include transactional data (e.g., credit card numbers) that may be shared across various platforms. In some instances, an application or service may access a microphone or a camera or camera roll associated with a user device, and collect information via the microphone or the camera. In some instances, an application or service may access a text messaging application, a phone application and/or calendar application associated with a user device, and collect contact information via such applications. As another example, the information may include location data, such as an internet protocol ("IP") address utilized to access the application or service, GPS data, navigation data from a map application, and so forth.

In some embodiments, the privacy risk determination system 101 may detect, via a computing device and over a network, a particular application or service deployed in a computing environment. For example, the privacy risk determination system 101 may detect applications or services that may be installed in a computing device. As another example, the privacy risk determination system 101 may detect applications or services that may be available over a network, such as a local area network ("LAN"), wide area network ("WAN"), a wireless local area network ("WLAN"), a storage area network, a server area network, and so forth.

In some examples, the one or more characteristics may include one or more of: (1) whether the particular application or service enables sharing with other users over the network, (2) whether the application or service incorporates opportunities to purchase other products or services, and (3) whether the particular application or service enables an offering of a commercial advertisement. For example, multi-player gaming applications may enable users to play simultaneously with each other over the network. Such applications may also enable information and data sharing among users. As another example, teleconferencing applications (video, audio, and so forth) may enable sharing of audio and video, in addition to other data that may be shared over the network. Also, for example, location sharing applications may enable users to share their location data with other users (e.g., friends, family, and so forth).

In some embodiments, the one or more characteristics may include whether the application or service incorporates opportunities to purchase other products or services. For example, applications or services may provide a platform that incorporates opportunities to purchase other products or services. For example, in a gaming application, a service provider may perform contextual analysis of a content of a game, and provide products and accessories associated with a gaming experience. In some examples, attributes of a current device configuration of a device hosting the gaming application may be provided to a third-party, and the third-party may then tailor its offerings of products to the user via the platform. For example, the platform may enable a user of the gaming application to compare different products such as gaming PCs, gaming mouse, gaming headsets, gaming chairs, gaming speakers, and so forth.

In some embodiments, the one or more characteristics may include whether the particular application or service enables an offering of a commercial advertisement. For example, applications or services may provide a platform to third parties to provide advertisements. For example, in an email application, a service provider may perform contextual analysis of the content of an email, and provide anonymized user preferences to a third-party, and the third-party may then tailor its advertisements to the user. Also, for example, a fitness application may collect health data and provide such information to third-parties, that may provide targeted advertisements for athletic wear, medical devices, and so forth. Also, for example, a gaming application may provide user information to third-parties that may provide advertisements for gaming products and accessories, additional games, videos, and so forth. Also, for example, an online shopping application may provide information to third-parties that may provide advertisements, sales notification, and/or coupons.

In some arrangements, the one or more characteristics may include a content rating for the particular application or service. For example, application developers and service providers may indicate a content rating for the applications and services. The content rating may be generally indicative of a type of content, and an intended target audience of users. For example, some gaming applications may provide an indication whether the content of the gaming application includes potentially objectionable content, such as, for example, graphic content, explicit language, violence, and so forth. For example, the Entertainment Software Rating Board ("ESRB") may provide ratings for entertainment related applications or services in the Americas. Such ratings may include, for example, "Unrated," "Everyone," "Everyone 10+," "Teen," "Mature,", and "Adults Only."

In some arrangements, the class of applications or services may include one of: a gaming application, a productivity application, and a music application. Generally, the term "application" may refer to any software application. Such software applications may include a variety of types of applications, which may be classified based on their functionalities. For example, the class of applications or services may include gaming applications. In some embodiments, the class of applications or services may include a sub-class of gaming applications, such as, for example, virtual reality applications, enhanced reality applications, applications that may be downloaded from a mobile application store, applications that have predominantly violent content, applications that are educational, and so forth.

As another example, the class of applications or services may include a productivity application. Generally, such applications may be used to create, manage, store, share, and/or edit documents associated with word processing, graphic design, presentation, data management, spreadsheet, and so forth.

Also, for example, the class of applications or services may include a music application. Generally, a music application may be used to create, synthesize, write, record, broadcast, and otherwise manipulate and/or disseminate music. Also, for example, a music application may include an application for music analysis, music education, music related games, orchestration software, samplers, sequencers, and so forth.

In some embodiments, privacy risk determination system 101 may retrieve information related to one or more characteristics of a plurality of applications or services deployed in a computing environment. For example, privacy risk determination system 101 may retrieve information from disclosures provided by application developers and service providers for the plurality of applications or services deployed in the computing environment. In some embodiments, privacy risk determination system 101 may retrieve such information periodically or in real-time. For example, an application developer may release a new version of an application, and the release notes may be indicative of a type of information that will be collected. Accordingly, privacy risk determination system 101 may compare the information with existing information about the older version of the application to determine if there are updates to the information that is collected, updates to a privacy policy, and so forth.

In some embodiments, privacy risk determination system 101 may extract the information related to the one or more characteristics from one or more of a description and a review of the particular application or service. For example, applications or services generally include a description. Accordingly, privacy risk determination system 101 may extract the information from the description. For example, a natural language processing technique (NLP) may be utilized to analyze and extract relevant information. Also, for example, developers, players, gaming enthusiasts may post reviews for the application or service related to gaming. For example, a review may state "the product collects your IP address. I am using a VPN." Accordingly, privacy risk determination system 101 may analyze a content of the review and determine that the particular application or service related to gaming collects an IP address.

In some embodiments, the privacy risk determination system 101 may determine, for each application or service in the associated class, a type of personal data collected. For example, a music application that provides digital content delivery may collect data related to musical preferences, playlists that are created, moods, behavioral aspects, social networks, sharing habits, genres, ethnicity, genre, and so forth, to customize delivery of content. Additionally, some music applications may enable a user to voluntarily share additional information that may be shared with third-parties. For example, payment data may be shared to purchase content, information related to mobile data may be shared to enhance streaming services, and so forth. As another example, a video delivery service may collect data related to user preferences, demographics, location data, quality of internet service, and so forth, to deliver tailored video content.

Although applications and services provide a user with an ability to change their privacy restrictions, users often forget to edit their preferences after the application or service is first installed. Also, for example, children may often download and install software applications without an understanding of potential privacy issues. As another example, privacy requirements, data collection activities, etc. may continue to change during a lifecycle of an application. As another example, a user may have consented to provide data for one instance of use of the application, but may have inadvertently consented to continued use and/or access to the data. Accordingly, it may be helpful to monitor types of applications or services, and data collected by these applications or services.

Risk metric application 106 may be configured to include one or more applications that may determine, for the particular application or service, a risk metric indicative of a type of personal data collected by the particular application or service in relation to the type of personal data collected by other applications or services in the associated class. Generally, the risk metric provides a quantitative measurement of relative risk profiles of applications or services. Applications or services in a given class may utilize personal data collected from users to provide features. However, some applications or services may collect more personal data than others. For example, two word processing applications may provide similar functionalities, but may collect varying degrees of personal data. Accordingly, the word processing application that collects more personal data may be associated with a higher risk metric than a word processing application that collects fewer personal data.

In some embodiments, risk metric application 106 may be configured to determine a probability that an application or service in the associated class collects personal data. For example, applications that provide navigation services generally collect real-time location data to provide updates and alerts related to traffic incidents, routes, tollways, congestion, and so forth. Accordingly, the class of navigation related applications may be associated with a high probability of collecting location data. As another example, a real estate application may collect location data to provide recommendations and alerts for properties that are on sale or are for rent. Real estate applications may also collect such location data and provide it to third-parties for targeted advertisements related to financing options, insurance options, home goods and appliances, and so forth. Accordingly, the class of real estate related applications may be associated with a high probability of collecting location data.

However, there may be web browsing applications that allow a user to navigate online resources anonymously without collecting personal data. A class comprising such applications may be associated with a low probability of collecting location data. Also, for example, another class of web browsing applications may not allow a user to navigate online resources anonymously, and may collect personal data. Accordingly, a second class comprising such applications may be associated with a high probability of collecting location data. Similar probabilities may be associated with a class that comprises both types of web browsing applications. Although the examples illustrate determining a probability based on location data, similar techniques may be applied to determine a probability based on other forms of personal data.

In some embodiments, risk metric application 106 may be configured to determine the risk metric based on the probability. For example, in some embodiments, a risk metric for an application a in class C may be determined as:

$$R(y_{aL})=0.5*(y_{aL}-P_C(L)+1), \quad (Eqn. 1)$$

where L is the event where personal data is collected, $y_{aL}=1$ if application a collects personal data, $y_{aL}=0$ if application a does not collect personal data, and $P_C(L)$ is the probability that applications in C collect personal data.

In some embodiments, risk metric application 106 may be configured to determine, for the associated class, a composite risk metric indicative of a type of personal data collected by the applications or services in the associated class, where the composite risk metric is an aggregate of risk metrics of applications or services in the associated class. For example, in a class of music applications or services, each application or service may be associated with a risk metric. Accordingly, risk metric application 106 may aggregate these individual risk metrics to determine a risk metric for the class of music applications or services. In some embodiments, the aggregate risk metric may be a normalized sum of the individual risk metrics. In some embodiments, the aggregate risk metric may be a normalized sum of weighted individual risk metrics. Other methods of value aggregation may be used such as, for example, a mean, median, or mode of the individual risk metrics.

In some embodiments, privacy risk determination system 101 may utilize a classification model 108 to cluster, based on the information, the plurality of applications or services into a plurality of classes. The classification model 108 may utilize one or more machine learning tools such as, for example, a linear regression, a decision tree, a support vector machine, a random forest, a k-means algorithm, gradient boosting algorithms, dimensionality reduction algorithms, and so forth. For example, classification model 108 may be provided with training data comprising information related to one or more characteristics, and applications or services that have been determined to share such characteristics. Accordingly, classification model 108 may be trained, for example, via supervised learning techniques, based on such labeled data, to learn an association between the one or more characteristics and applications or services. Based on such information, classification model 108 may be trained to determine additional clusters.

In some instances, information related to one or more characteristics may be unstructured, and a combination of supervised and semi-supervised learning techniques may be utilized to train classification model 108. For example, classification model 108 may be configured to detect patterns in information related to one or more characteristics, and apply these patterns to detect a type of data being collected. Also, for example, classification model 108 may be configured to detect patterns between types of applications or services. The classification model 108 may be configured to analyze such and other factors, determine patterns, and determine clusters based on such patterns. In some embodiments, an output of the classification model 108 may be reviewed by a human operator. Accordingly, the human operator may confirm the analysis or modify it, and this may form additional training data for the classification model 108.

In some embodiments, classification model 108 may generate feature vectors indicative of the one or more characteristics of an application or service. Such feature vectors may be compared, based on similarity or other distance measuring metrics, to determine applications or services that are proximate to each other. Accordingly, applications or services may be clustered based on similarity of the one or more characteristics.

In some examples, classification model 108 may associate, in a database (e.g., central data storage platform 104), each application or service of the first plurality of applications or services with a class of the second plurality of classes. For example, a gaming application may be associated with a class of gaming applications, a music application may be associated with a class of music applications, and so forth. In some embodiments, one application may be associated with more than one class. For example, a music application may provide a platform to stream music, and may also provide a music-themed gaming application. Accordingly, such a music application may be associated with the class of gaming applications and the class of music applications.

The central data storage platform 104 may be incorporated into the privacy risk determination system 101 or may be separate components. As an example, central data storage platform 104 may be configured to store, for each class of applications, the applications or services that are associated with that class. Also, for example, central data storage platform 104 may be configured to store, for each application or service, the one or more characteristics of the application or service. As another example, central data storage platform 104 may be configured to store, for each application or service, a risk metric associated with the application or service, and/or a composite risk metric associated with the class of applications or services. In some embodiments, central data storage platform 104 may be configured to be indexed so as to be a readily searchable database.

The data stored in central data storage platform 104 may be collected and compiled by privacy risk determination system 101, risk metric application 106, recommendation system 110, and classification model 108, or by servers and subsystems within privacy risk determination system 101. In some embodiments, privacy risk determination system 101 may collect information from, and transmit information to, each of the various applications, databases, devices, and backend servers described in FIG. 1.

In some embodiments, privacy risk determination system 101 may utilize recommendation system 110 to recommend, via the computing device and based on the risk metric, an additional or alternative application or service with a lower risk than the particular application or service. For example, privacy risk determination system 101 may identify applications or services that provide similar functionality, but that may have a lower risk profile (e.g., a lower risk metric). For example, privacy risk determination system 101 may identify applications or services that may be collecting more personal data of a given type relative to other similar applications or services. Accordingly, recommendation system 110 may recommend the applications or services that have a lower risk profile.

For example, based on Eqn. 1, for a class of gaming applications, C, the probability $P_C(L)$ that applications in C collect location data may be determined to be 0.6. If a first application collects location data, then $y_{aL}=1$, and an application of Eqn. 1 provides a risk metric for the first application to be:

$$0.5*(y_{aL}-P_C(L)+1)=0.5*(1-0.6+1)=0.7. \quad \text{(Eqn. 2)}$$

Also, for example, is a second application does not collect location data, then $y_{aL}=0$, and another application of Eqn. 1 provides a risk metric for the second application to be:

$$0.5*(y_{aL}-P_C(L)+1)=0.5*(0-0.6+1)=0.2. \quad \text{(Eqn. 3)}$$

Accordingly, since 0.2 is a lower value than 0.7 (from Eqn. 2), privacy risk determination system 101 may identify the second application to have a lower risk profile than the first application, and recommendation system 110 may recommend the second application to a user.

In some embodiments, recommendation system 110 may recommend the additional application or service based on the composite risk metric. For example, the class associated with the first application and the second application may have a composite risk metric of 0.3. Accordingly, since the risk metric associated with the second application, 0.2, is a lower value than the composite risk metric of 0.3, privacy risk determination system 101 may identify the second application to have a lower risk profile, and recommendation system 110 may recommend the second application to a user.

As another example, the class associated with the first application and the second application may have a composite risk metric of 0.1. Accordingly, since the risk metric associated with the second application, 0.2, is a higher value than the composite risk metric of 0.1, privacy risk determination system 101 may determine that the second application has a higher risk profile than other applications in the class. Accordingly, it may identify another application that has a risk metric lower than 0.1, and recommendation system 110 may recommend such application to a user.

In some embodiments, privacy risk determination system 101 may communicate with central server infrastructure 102 and receive data related to changes in disclosure information, changes in data collection, user enabled restrictions, etc. Privacy risk determination system 101 may collect real-time data from applications and/or services deployed in the computing environment. In some examples, real-time data may be transmitted by the privacy risk determination system 101 (e.g., via the risk metric application 106, the recommendation system 110, and the classification model 108, and so forth) to the central server infrastructure 102.

Although recommendation system 110, classification model 108, and risk metric application 106 are shown as separate elements from the privacy risk determination system 101, one or more of them may be within the same structure. In particular, privacy risk determination system 101 may be configured to perform one or more (or all) functions performed by classification model 108, recommendation system 110, and risk metric application 106.

In one or more arrangements, aspects of the present disclosure may be implemented with a computing device. FIG. 2 illustrates a block diagram of an example privacy risk determination device 200 that may be used in accordance with aspects described herein. The privacy risk determination device 200 may be a computing device such as a personal computer (e.g., a desktop computer), server, laptop computer, notebook, tablet, smartphone, etc.

The privacy risk determination device 200 may have a data collection module 201 for retrieving and/or analyzing one or more characteristics of applications or services, as described herein. The data collection module 201 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 201 may refer to the software and/or hardware used to implement the data collection module 201. In cases where the data collection module 201 includes one or more processors, such processors may be specially configured to perform the processes disclosed herein. Additionally, or alternatively, the data collection module 201 may include one or more processors configured to execute computer-executable instructions, which may be stored on a storage medium, to perform the processes disclosed herein. In some examples, privacy risk determination device 200 may include one or more processors 203 in addition to, or instead of, the data collection module 201. The processor(s) 203 may be configured to operate in conjunction with data collection module 201. Both the data collection module 201 and the processor(s) 203 may be capable of controlling operations of privacy risk determination device 200 and its associated components, including RAM 205, ROM 207, an input/output (I/O) module 209, a network interface 211, and memory 213. For example, data collection module 201 and processor(s) 203 may each be configured to read/write computer-executable instructions and other values from/to the RAM 205, ROM 207, and memory 213.

The I/O module 209 may be configured to be connected to an input device 215, such as a microphone, keypad, keyboard, touchscreen, and/or stylus through which a user of privacy risk determination device 200 may provide input data. The I/O module 209 may also be configured to be connected to a display device 217, such as a monitor, television, touchscreen, etc., and may include a graphics card. The display device 217 and input device 215 are shown as separate elements from the privacy risk determination device 200; however, they may be within the same structure. On some privacy risk determination devices 200, the input device 215 may be operated by a user to interact with data collection module 201, including providing information about user information, account information, rating information, privacy settings, etc. System administrators may use the input device 215 to make updates to data collection module 201, such as software updates. Meanwhile, the display device 217 may assist the system administrators and users to confirm/appreciate their inputs.

The memory 213 may be any computer-readable medium for storing computer-executable instructions (e.g., software). The instructions stored within memory 213 may enable the privacy risk determination device 200 to perform various functions. For example, memory 213 may store software used by the privacy risk determination device 200, such as an operating system 219 and application programs 221, and may include an associated database 223.

Although not shown in FIG. 2, various elements within memory 213 or other components in the privacy risk determination device 200 may include one or more caches, for example, CPU caches used by the processor(s) 203, page caches used by the operating system 219, disk caches of a hard drive, and/or database caches used to cache content from database 223. For embodiments including a CPU cache, the CPU cache may be used by one or more processors in the processor 203 to reduce memory latency and access time. In such examples, the processor 203 may retrieve data from or write data to the CPU cache rather than reading/writing to memory 213, which may improve the speed of these operations. In some examples, a database cache may be created in which certain data from a central database of, for example, one or more servers 240 (e.g., an application server, a cloud service provider, etc.) is cached in a separate smaller database on an application server separate from the database server. For instance, in a multi-tiered application, a database cache on an application server can reduce data retrieval and data manipulation time by not having to communicate over a network with a back-end database server such as, for example, one or more servers 240. These types of caches and others may be included in various embodiments, and may provide potential advantages in certain implementations of retrieving and analyzing the one or more characteristics, such as faster response times and less dependence on network conditions when transmitting/receiving data from one or more servers 240.

The network interface 211 may allow privacy risk determination device 200 to connect to and communicate with a network 230. The network 230 may be any type of network, including a local area network (LAN) and/or a wide area network (WAN), such as the Internet, a cellular network, or satellite network. Through the network 230, privacy risk determination device 200 may communicate with one or more other computing devices, such as laptops, notebooks, smartphones, tablets, personal computers, servers, vehicles, home management devices, home security devices, smart appliances, etc. Through the network 230, privacy risk determination device 200 may communicate with one or more servers 240 to exchange information related to the one or more characteristics. Through the network 230, privacy risk determination device 200 may communicate with one or more computing devices, such as user devices.

The network interface 211 may connect to the network 230 via communication lines, such as coaxial cable, fiber optic cable, etc., or wirelessly using a cellular backhaul or a wireless standard, such as IEEE 802.11, IEEE 802.15, IEEE 802.16, etc. Further, the network interface 211 may use various protocols, including TCP/IP, Ethernet, File Transfer Protocol (FTP), Hypertext Transfer Protocol (HTTP), etc., to communicate with other user devices, and/or servers 240.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies.

Figure 3:
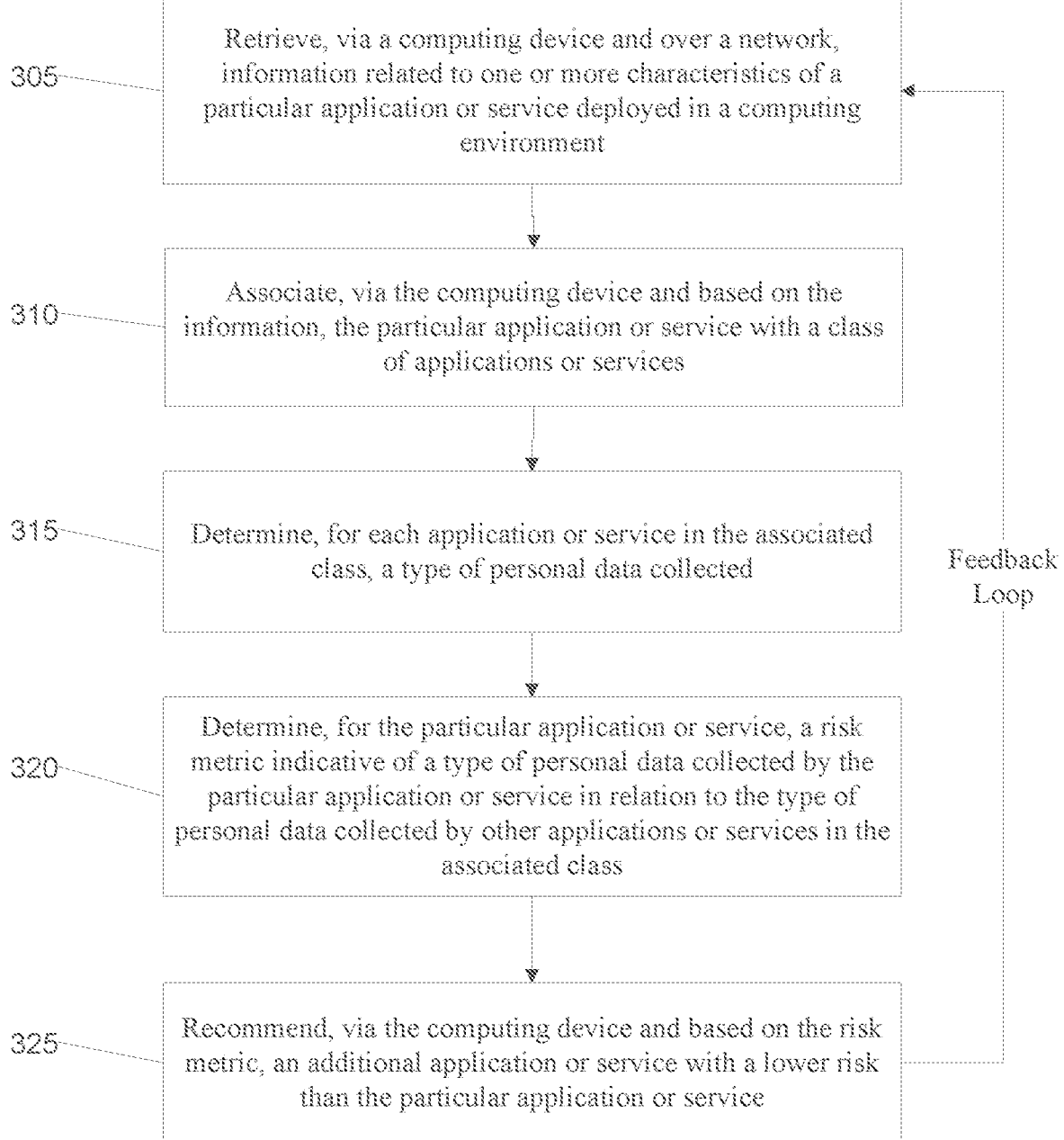
FIG. 3 illustrates an example method for performing risk determination functions for applications or services in accordance with one or more aspects described herein.

FIG. 3 illustrates an example method for performing risk determination functions for applications or services in accordance with one or more aspects described herein.

At step 305, privacy risk determination system 101 may retrieve, via a computing device and over a network, information related to one or more characteristics of a particular application or service deployed in a computing environment. Information may include, for example, a type of data that is collected, a purpose for such data collection, how the data may be used, where the data may be stored, who the data may be shared with (names and websites of third parties), and so forth. In some arrangements, the one or more characteristics may include a content rating for the particular application or service.

At step 310, privacy risk determination system 101 may associate, via the computing device and based on the information, the particular application or service with a class of applications or services. For example, the class of applications or services may include gaming applications. In some embodiments, the class of applications or services may include a sub-class of gaming applications, such as, for example, virtual reality applications, enhanced reality applications, applications that may be downloaded from a mobile application store, applications that have predominantly violent content, applications that are educational, and so forth.

At step 315, privacy risk determination system 101 may determine, for each application or service in the associated class, a type of personal data collected. For example, a music application that provides digital content delivery may collect data related to musical preferences, playlists that are created, moods, behavioral aspects, social networks, sharing habits, genres, ethnicity, and so forth, to customize delivery of content.

At step 320, privacy risk determination system 101 may determine, for the particular application or service, a risk metric indicative of a type of personal data collected by the particular application or service in relation to the type of personal data collected by other applications or services in the associated class. Generally, the risk metric provides a quantitative measurement of relative risk profiles of applications or services. For example, two word processing applications may provide similar functionalities, but may collect varying degrees of personal data. Accordingly, the word processing application that collects more personal data may be associated with a higher risk metric than a word processing application that collects less personal data.

At step 325, privacy risk determination system 101 may recommend, via the computing device and based on the risk metric, an additional application or service with a lower risk than the particular application or service. For example, privacy risk determination system 101 may identify applications or services that provide similar functionality, but that may have a lower risk profile (e.g., a lower risk metric). For example, privacy risk determination system 101 may identify applications or services that may be collecting more personal data of a given type relative to other similar applications or services. Accordingly, recommendation system 110 may recommend the applications or services that have a lower risk profile.

In some embodiments, the process may return to step 305 to retrieve second information related to one or more second characteristics of a second application or service deployed in the computing environment.

Figure 4:
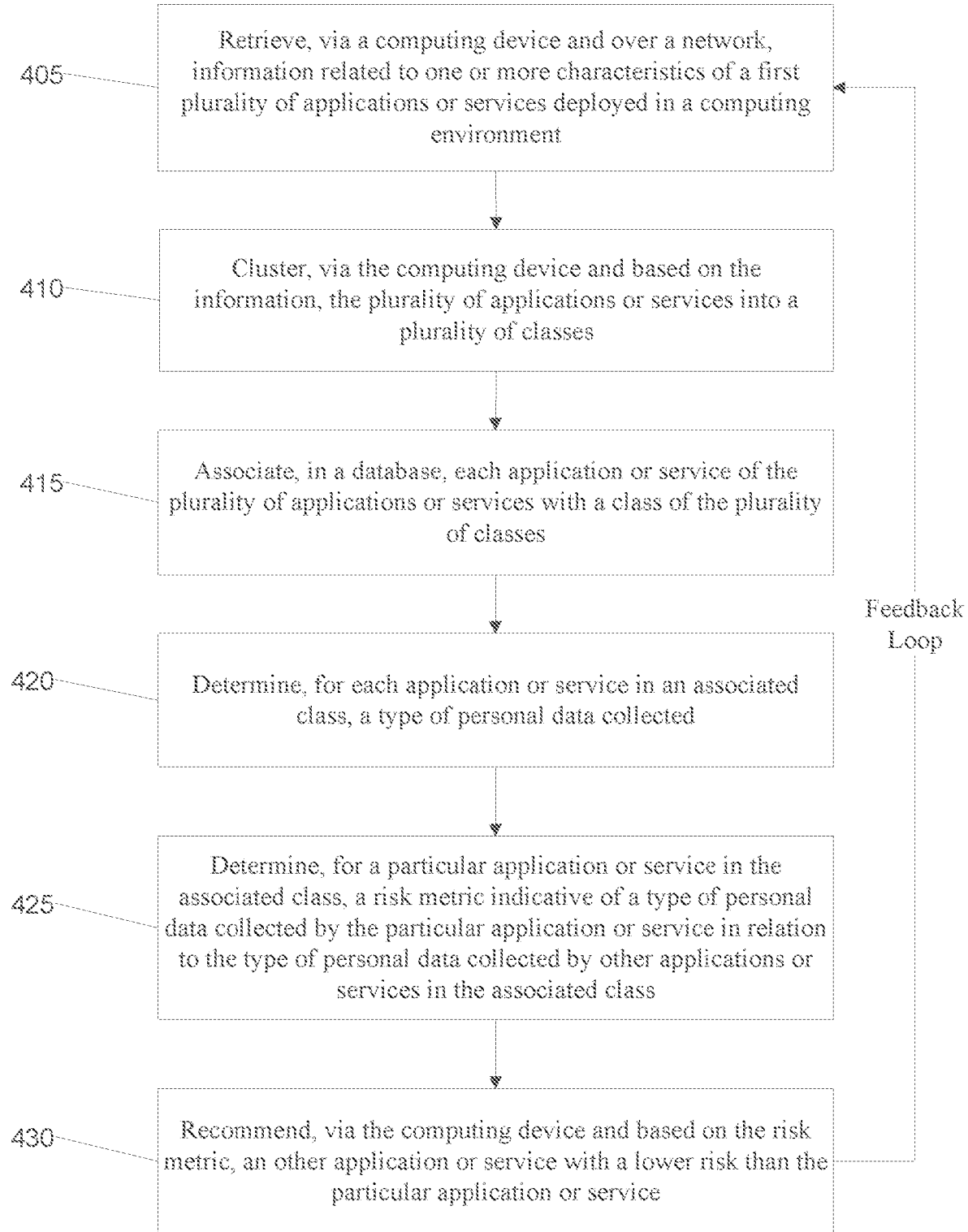
FIG. 4 illustrates another example method for performing risk determination functions for applications or services in accordance with one or more aspects described herein.

FIG. 4 illustrates another example method for performing risk determination functions for applications or services in accordance with one or more aspects described herein.

At step 405, privacy risk determination system 101 may retrieve, via a computing device and over a network, information related to one or more characteristics of a plurality of applications or services deployed in a computing environment. For example, privacy risk determination system 101 may retrieve information from disclosures provided by application developers and service providers for the plurality of applications or services deployed in the computing environment.

At step 410, privacy risk determination system 101 may cluster, via the computing device and based on the information, the plurality of applications or services into a plurality of classes. For example, privacy risk determination system 101 may utilize one or more machine learning tools such as, for example, a linear regression, a decision tree, a support vector machine, a random forest, a k-means algorithm, gradient boosting algorithms, dimensionality reduction algorithms, and so forth, to group together applications or services that have been determined to share one or more characteristics.

At step 415, privacy risk determination system 101 may associate, in a database, each application or service of the plurality of applications or services with a class of the plurality of classes. For example, a gaming application may be associated with a class of gaming applications, a music application may be associated with a class of music applications, and so forth.

At step 420, privacy risk determination system 101 may determine, for each application or service in an associated class, a type of personal data collected. For example, a video delivery service may collect data related to user preferences, demographics, location data, quality of internet service, and so forth, to deliver tailored video content.

At step 425, privacy risk determination system 101 may determine, for a particular application or service in the associated class, a risk metric indicative of a type of personal data collected by the particular application or service in relation to the type of personal data collected by other applications or services in the associated class. For example, applications or services in a given class may utilize personal data collected from users to provide features. However, some applications or services may collect more personal data than others. The risk metric is indicative of such differences in an amount of personal data collection by different applications or services.

At step 430, privacy risk determination system 101 may recommend, via the computing device and based on the risk metric, another application or service with a lower risk than the particular application or service. For example, privacy risk determination system 101 may recommend, via the computing device and based on the risk metric, an additional or alternative application or service with a lower risk than the particular application or service. For example, the risk metric for the first gaming application may be lower than the risk metric for the second gaming application. Accordingly, privacy risk determination system 101 may recommend the first gaming application to a user.

In some embodiments, the process may return to step 405 to retrieve second information related to one or more second characteristics of a second plurality of applications or services deployed in the computing environment.

Figure 5:
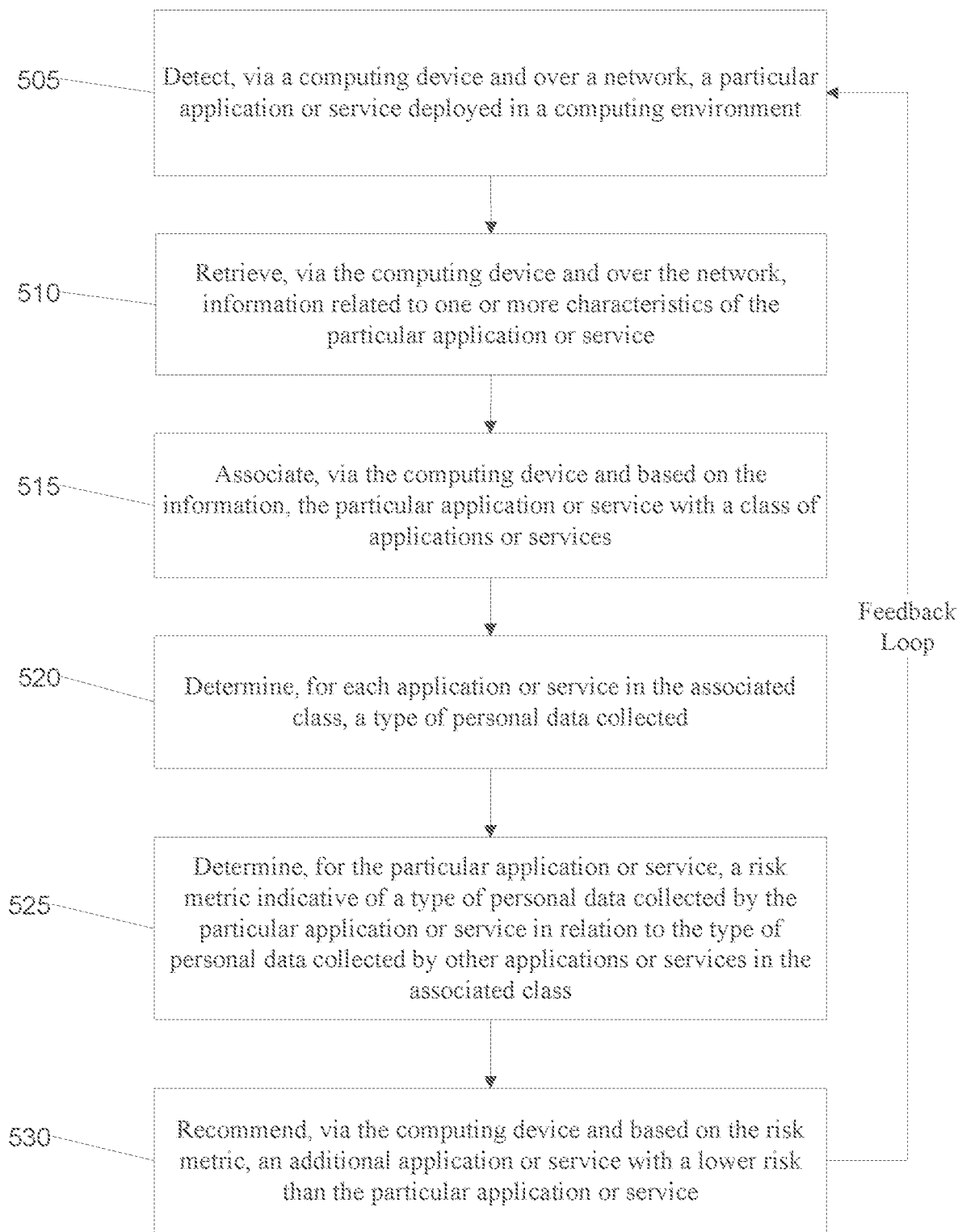
FIG. 5 illustrates another example method for performing risk determination functions for applications or services in accordance with one or more aspects described herein.

FIG. 5 illustrates another example method for a dynamic system profiling based on data extraction in accordance with one or more aspects described herein.

At step 505, privacy risk determination system 101 may detect, via a computing device and over a network, a particular application or service deployed in a computing environment. For example, the privacy risk determination system 101 may detect applications or services that may be installed in a computing device. As another example, the privacy risk determination system 101 may detect applications or services that may be available over a network, such as a local area network ("LAN"), wide area network ("WAN"), a wireless local area network ("WLAN"), a storage area network, a server area network, and so forth.

At step 510, privacy risk determination system 101 may retrieve, via the computing device and over the network, information related to one or more characteristics of the particular application or service. For example, the information may include transactional data (e.g., credit card numbers) that may be shared across various platforms. Also, for example, the one or more characteristics may include one or more of: (1) whether the particular application or service enables sharing with other users over the network, (2) whether the application or service incorporates opportunities to purchase other products or services, and (3) whether the particular application or service enables an offering of a commercial advertisement. For example, multi-player gaming applications may enable users to play simultaneously with each other over the network.

At step 515, privacy risk determination system 101 may associate, via the computing device and based on the information, the particular application or service with a class of applications or services. For example, the class of applications or services may include a productivity application. Generally, such applications may be used to create, manage, store, share, and/or edit documents associated with word processing, graphic design, presentation, data management, spreadsheet, and so forth.

At step 520, privacy risk determination system 101 may determine, for each application or service in the associated class, a type of personal data collected. For example, payment data may be collected to purchase content, information related to mobile data may be collected and/or shared to enhance streaming services, and so forth.

At step 525, privacy risk determination system 101 may determine, for the particular application or service, a risk metric indicative of a type of personal data collected by the particular application or service in relation to the type of personal data collected by other applications or services in the associated class. For example, two music applications may provide similar functionalities, but may collect varying degrees of personal data. Accordingly, the music application that collects more personal data may be associated with a higher risk metric than a music application that collects fewer personal data.

At step 530, privacy risk determination system 101 may recommend, via the computing device and based on the risk metric, an additional application or service with a lower risk than the particular application or service. For example, privacy risk determination system 101 may recommend the music application that collects fewer personal data.

In some embodiments, the process may return to step 505 to detect a second application or service deployed in the computing environment.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the invention.

What is claimed is:

1. A method comprising:
   retrieving, via one or more computing devices and over a network, information related to one or more characteristics of a particular application stored or executing on the one or more computing devices;
   associating, via the one or more computing devices and based on the information, the particular application with a class of applications;
   determining, for one or more application in the associated class, a type of personal data collected;
   determining, for the particular application, a risk metric indicative of a type of personal data collected by the particular application in relation to the type of personal data collected by other applications in the associated class; and
   recommending, via the one or more computing devices and based on the risk metric, an additional application that collects the type of personal data collected by the particular application and has a lower risk than the particular application.

2. The method of claim 1, further comprising:
   determining, for the associated class, a composite risk metric indicative of a type of personal data collected by the one or more application in the associated class, wherein the composite risk metric is an aggregate of a plurality of determined risk metrics of a plurality of applications in the associated class.

3. The method of claim 2, wherein recommending the additional application is based on the composite risk metric.

4. The method of claim 1, further comprising:
   determining a probability that an application in the associated class collects personal data, and
   wherein determining the risk metric is based on the probability.

5. The method of claim 1, wherein the class of applications includes at least one of: a gaming application, a productivity application, or a music application.

6. The method of claim 1, wherein the one or more characteristics include at least one of: whether the particular application enables sharing with other users over the network; whether the particular application incorporates opportunities to purchase other products or services; or whether the particular application enables an offering of a commercial advertisement.

7. The method of claim 1, wherein the one or more characteristics comprises a content rating for the particular application.

8. The method of claim 1, further comprising:
   extracting the information related to the one or more characteristics from at least one of a description or a review of the particular application.

9. The method of claim 1, wherein the additional application is in the associated class with the particular application.

10. An apparatus comprising:
    a processor; and
    a memory unit storing computer-executable instructions, which when executed by the processor, cause the apparatus to:
       retrieve, via one or more computing devices and over a network, information related to one or more characteristics of a plurality of applications stored or executing on the one or more computing devices;

cluster, via the one or more computing devices and based on the information, the plurality of applications into a plurality of classes;

associate, in a database, one or more application of the plurality of applications with a class of the plurality of classes, the associated class including at least one of a gaming application, a virtual or enhanced reality application, a productivity application, a word processing application, a graphic design application, a presentation application, a graphic design application, a data management application, a spreadsheet application, an educational application, a violent content application, or a music-related application;

determine, for the one or more application in the associated class, a type of personal data collected;

determine, for a particular application in the associated class, a risk metric indicative of a type of personal data collected by the particular application in relation to the type of personal data collected by other applications in the associated class; and recommend, via the one or more computing devices and based on the risk metric, an other application in the associated class with a lower risk than the particular application.

11. The apparatus of claim 10, wherein the computer-executable instructions, when executed by the processor, cause the apparatus to:

determine, for the associated class, a composite risk metric indicative of a type of personal data collected by the one or more application in the associated class, wherein the composite risk metric is an aggregate of a plurality of risk metrics of a plurality of applications in the associated class.

12. The apparatus of claim 11, wherein recommending the other application is based on the composite risk metric.

13. The apparatus of claim 10, wherein the computer-executable instructions, when executed by the processor, cause the apparatus to:

determine a probability that an application in the associated class collects personal data, and wherein determining the risk metric is based on the probability.

14. The apparatus of claim 10, wherein the one or more characteristics include at least one of: whether the particular application enables sharing with other users over the network; whether the particular application incorporates opportunities to purchase other products or services; or whether the particular application enables an offering of a commercial advertisement.

15. The apparatus of claim 10, wherein the one or more characteristics comprise a content rating for the particular application.

16. The apparatus of claim 10, wherein the computer-executable instructions, when executed by the processor, cause the apparatus to:

extract the information related to the one or more characteristics from at least one of a description or a review of the particular application.

17. One or more non-transitory computer-readable media storing instructions that, when executed by a computing device, cause the computing device to:

detect, via one or more computing devices and over a network, a particular application stored or executing on the one or more computing devices;

retrieve, via the one or more computing devices and over the network, information related to one or more characteristics of the particular application, the one or more characteristics including at least one of:

whether the particular application enables sharing with other users over the network;

whether the particular application incorporates opportunities to purchase other products or services;

whether the particular application enables an offering of a commercial advertisement;

whether the particular application accesses a camera, a camera roll, a text messaging application, a phone application, a calendar application, or a microphone associated with the one or more computing devices;

a content rating of the particular application; or location data associated with the particular application;

associate, via the one or more computing devices and based on the information, the particular application with a class of applications;

determine, for one or more application in the associated class, a type of personal data collected;

determine, for the particular application, a risk metric indicative of a type of personal data collected by the particular application in relation to the type of personal data collected by other applications in the associated class; and recommend, via the one or more computing devices and based on the risk metric, an additional application with a lower risk than the particular application.

18. The one or more non-transitory computer-readable media of claim 17, wherein the instructions cause the computing device to:

determine, for the associated class, a composite risk metric indicative of a type of personal data collected by the one or more application in the associated class, wherein the composite risk metric is an aggregate of a plurality of risk metrics of a plurality of applications in the associated class.

19. The one or more non-transitory computer-readable media of claim 18, wherein recommending the additional application is based on the composite risk metric.

20. The one or more non-transitory computer-readable media of claim 17, wherein the instructions cause the computing device to:

determine a probability that an application in the associated class collects personal data, and wherein determining the risk metric is based on the probability.

* * * * *